(12) United States Patent
Parker et al.

(10) Patent No.: US 10,584,737 B2
(45) Date of Patent: Mar. 10, 2020

(54) COMPRESSION LOADED BALL SOCKET ASSEMBLY

(71) Applicant: Federal-Mogul Motorparts LLC, Southfield, MI (US)

(72) Inventors: Glen C. Parker, Saint Peters, MO (US); Eric M. Kopsie, Bethalto, IL (US)

(73) Assignee: Federal-Mogul Motorparts LLC, Southfield, MI (US)

( * ) Notice: Subject to any disclaimer, the term of this patent is extended or adjusted under 35 U.S.C. 154(b) by 0 days.

(21) Appl. No.: 16/407,553

(22) Filed: May 9, 2019

(65) Prior Publication Data

US 2019/0264733 A1 Aug. 29, 2019

Related U.S. Application Data

(63) Continuation-in-part of application No. 15/070,363, filed on Mar. 15, 2016.

(60) Provisional application No. 62/670,035, filed on May 11, 2018.

(51) Int. Cl.
| | | |
|---|---|---|
| *F16C 11/06* | (2006.01) | |
| *B60S 5/00* | (2006.01) | |
| *B62D 7/18* | (2006.01) | |
| *B60B 35/04* | (2006.01) | |

(52) U.S. Cl.
CPC .......... *F16C 11/0647* (2013.01); *B60B 35/04* (2013.01); *B60S 5/00* (2013.01); *B62D 7/18* (2013.01)

(58) Field of Classification Search
CPC ..... Y10T 403/32713; Y10T 403/32721; Y10T 403/32737; Y10T 403/32762; Y10T 403/32786; Y10T 403/32803; Y10T 403/32811; F16C 11/0628; F16C 11/0642;
(Continued)

(56) References Cited

U.S. PATENT DOCUMENTS 2,494,739 A * 1/1950 Booth ................. F16C 11/0609
403/127
2,544,583 A * 3/1951 Booth ................. F16C 11/0609
403/127
(Continued)

OTHER PUBLICATIONS

International Search Report, dated Jul. 24, 2019 (PCT/US2019/031640).

*Primary Examiner* — Daniel J Wiley
(74) *Attorney, Agent, or Firm* — Robert L. Stearns; Dickinson Wright, PLLC

(57) ABSTRACT

The ball socket assembly includes a housing that is made as a monolithic piece and has an inner bore. The ball socket assembly also includes a ball stud that has a semi-spherically curved portion, a cylindrical portion, and a shank portion. The ball socket assembly further includes a backing bearing and an exit bearing. A third bearing is received on the cylindrical portion of the ball stud. The third bearing has a curved outer surface which cooperates with the curved inner surface of at least one of the exit and backing bearings for allowing the ball stud and the bearing to articulate and rotate relative to the housing. The third bearing is also in slidable contact with the cylindrical portion of the ball stud for allowing the ball stud to more freely rotate relative to the housing about the central axis.

15 Claims, 7 Drawing Sheets

(58) Field of Classification Search
CPC . F16C 11/0666; F16C 11/0671; F16C 11/068; F16C 11/0685; F16C 11/086
See application file for complete search history.

(56) References Cited

U.S. PATENT DOCUMENTS

| | | | | |
|---|---|---|---|---|
| 2,618,049 A * | 11/1952 | Flumerfelt | ......... | F16C 11/0604 29/441.1 |
| 2,631,044 A * | 3/1953 | Booth | .................. | B60G 7/005 280/124.108 |
| 2,846,252 A * | 8/1958 | Herbenar | ........... | F16C 11/0609 403/130 |
| 2,861,827 A * | 11/1958 | Langen | ............... | F16C 11/0604 403/132 |
| 2,880,025 A * | 3/1959 | Herbenar | ........... | F16C 11/0604 403/133 |
| 2,993,717 A * | 7/1961 | Gottschald | .............. | F16C 11/06 403/133 |
| 3,027,182 A * | 3/1962 | Reuter | ................ | F16C 11/0633 403/134 |
| 3,088,784 A * | 5/1963 | Melton | ............... | F16C 11/0676 403/135 |
| 3,128,110 A * | 4/1964 | Herbenar | ........... | F16C 11/0633 403/138 |
| 3,343,857 A * | 9/1967 | Cislo | ..................... | B60G 7/005 403/132 |
| 3,376,058 A * | 4/1968 | Herbenar | ........... | F16C 11/0604 403/126 |
| 3,722,931 A * | 3/1973 | Uchida | ............... | F16C 11/0619 403/140 |
| 3,951,557 A * | 4/1976 | Herbenar | ........... | F16C 11/0638 403/138 |
| 4,163,617 A * | 8/1979 | Nemoto | .............. | F16C 11/0642 403/132 |
| 4,231,673 A * | 11/1980 | Satoh | .................. | F16C 11/0633 403/125 |
| 4,493,512 A * | 1/1985 | Smith, Jr. | ........... | F16C 11/0671 384/2 |
| 4,875,794 A * | 10/1989 | Kern, Jr. | ................ | F16C 11/086 403/132 |
| 5,066,160 A * | 11/1991 | Wood | ..................... | B62D 7/166 403/140 |
| 5,154,530 A * | 10/1992 | Dresselhouse | ........... | B62D 7/16 403/138 |
| 5,564,853 A * | 10/1996 | Maughan | ........... | F16C 11/0619 403/137 |
| 6,010,271 A * | 1/2000 | Jackson | .............. | F16C 11/0628 403/131 |
| 6,171,012 B1 * | 1/2001 | Westphal | ........... | F16C 11/0652 403/137 |
| 6,350,075 B1 * | 2/2002 | Abels | .................. | F16C 11/0666 277/635 |
| 6,533,490 B2 * | 3/2003 | Kincaid | ................ | B60G 7/005 403/133 |
| 7,862,250 B2 * | 1/2011 | Kuru | .................... | F16C 11/068 403/134 |
| 8,678,656 B2 * | 3/2014 | Richter | .............. | F16C 11/0638 384/213 |
| 2006/0171775 A1 * | 8/2006 | McLaughlin | ....... | F16C 11/0614 403/122 |
| 2009/0211390 A1 * | 8/2009 | Brogardh | ........... | B25J 17/0266 74/490.03 |
| 2011/0142534 A1 * | 6/2011 | Brogardh | ........... | F16C 11/0647 403/141 |
| 2014/0205366 A1 * | 7/2014 | Mevorach | .............. | B60G 7/005 403/144 |
| 2017/0350441 A1 | 12/2017 | Parker, Jr. et al. | | |

* cited by examiner

COMPRESSION LOADED BALL SOCKET ASSEMBLY

CROSS-REFERENCE TO RELATED APPLICATIONS

This application is a continuation-in-part application claims the benefit of U.S. application Ser. No. 15/070,363, filed Mar. 15, 2016, and also claims the benefit of U.S. Provisional Application No. 62/670,035, filed May 11, 2018, the entire contents of which are hereby incorporated by references.

BACKGROUND OF THE INVENTION

1. Field of the Invention

The present invention is related generally to ball socket assemblies, and more particularly, to ball socket assemblies for use in solid axle suspension assemblies of vehicles.

2. Related Art

In vehicles with solid axle assemblies, for each wheel, a pair of ball joints operably attach an axle with a knuckle. The two ball joints are aligned with one another along a vertically extending axis and allow the knuckle to pivot about this axis in response to a steering input from a driver, thereby turning a wheel attached with the knuckle. Each ball joint includes a housing; a ball stud with a ball portion; and at least one bearing which facilitates a low friction interface between the ball stud and the housing.

When the ball joints of a solid axle assembly are installed correctly such that the spherical center distances of the ball portions are spaced along the vertically extending axis from one another by a prescribed distance, the ball joints will generally equally share an axial load exerted by the weight of the vehicle. However, if improper installation occurs, one of the ball joints may be forced to carry all of the downward axial load with the other ball joint experiencing an upward load. Under this condition where opposing axial loads are placed on the ball joints, an increase in rotational resistance or torque can develop due to high contact pressures between the ball portions of the ball studs and the bearings, thus making steering more difficult.

SUMMARY OF THE INVENTION AND ADVANTAGES

One aspect of the present invention is related to a ball socket assembly for use in a solid axle assembly. The ball socket assembly includes a housing that has an inner surface and a lower wall which are made as a monolithic piece and which surround an inner bore that extends along a central axis. The ball socket assembly also includes a ball stud that has a semi-spherically curved portion, a cylindrical portion, and a shank portion. The semi-spherically curved portion and the cylindrical portion are disposed in the inner bore of the housing. The shank portion projects out of the inner bore through an open end of the housing opposite of the lower wall. The ball socket assembly further includes a backing bearing and an exit bearing which are both received in the inner bore of the housing and which both have respective curved inner surfaces. A third bearing is received on the cylindrical portion of the ball stud. The third bearing has a curved outer surface which cooperates with the curved inner surface of at least one of the exit and backing bearings for allowing the ball stud and the bearing to articulate and rotate relative to the housing. The third bearing is also in slidable contact with the cylindrical portion of the ball stud for allowing the ball stud to more freely rotate relative to the housing about the central axis.

In the event that the two ball studs are misinstalled in the solid axle assembly such that the vertical distance between the ball studs is not within prescribed tolerances, in contrast to other known ball socket assemblies where the ball stud can become restricted against rotation, the third bearing allows relative rotation between the housing and ball stud to continue with little restriction.

According to another aspect of the present invention, the ball stud has a planar first surface which extends between the semi-spherically curved portion and the cylindrical portion; wherein the third bearing has a second planar surface; and wherein the first and second planar surfaces are in surface-to-surface contact with one another.

According to yet another aspect of the present invention, the third bearing is located axially between the backing bearing and the exit bearing.

According to still another aspect of the present invention, the third bearing is in a loose fit relationship with the cylindrical portion of the ball stud.

According to a further aspect of the present invention, a washer spring is received in the inner bore of the housing and is elastically deformed to impart an axial force on the exit bearing to bias the curved inner surface of the exit bearing against the curved outer surface of the third bearing.

According to yet a further aspect of the present invention, the semi-spherically curved portion of the ball stud is generally hemispherical in shape.

Another aspect of the present invention is related to a solid axle assembly in a vehicle. The solid axle assembly includes an axle, a knuckle, and a pair of the ball socket assemblies as described above.

Yet another aspect of the present invention is related to a method of repairing a solid axle assembly. The method includes the step of removing a previously used ball socket assembly from an opening of an axle or a knuckle. The method proceeds with the step of inserting the ball socket described above into the opening.

BRIEF DESCRIPTION OF THE DRAWINGS

These and other features and advantages of the invention will become more readily appreciated when considered in connection with the following description of the presently preferred embodiments, appended claims and accompanying drawings, in which:

DESCRIPTION OF THE ENABLING EMBODIMENT

Figure 1:
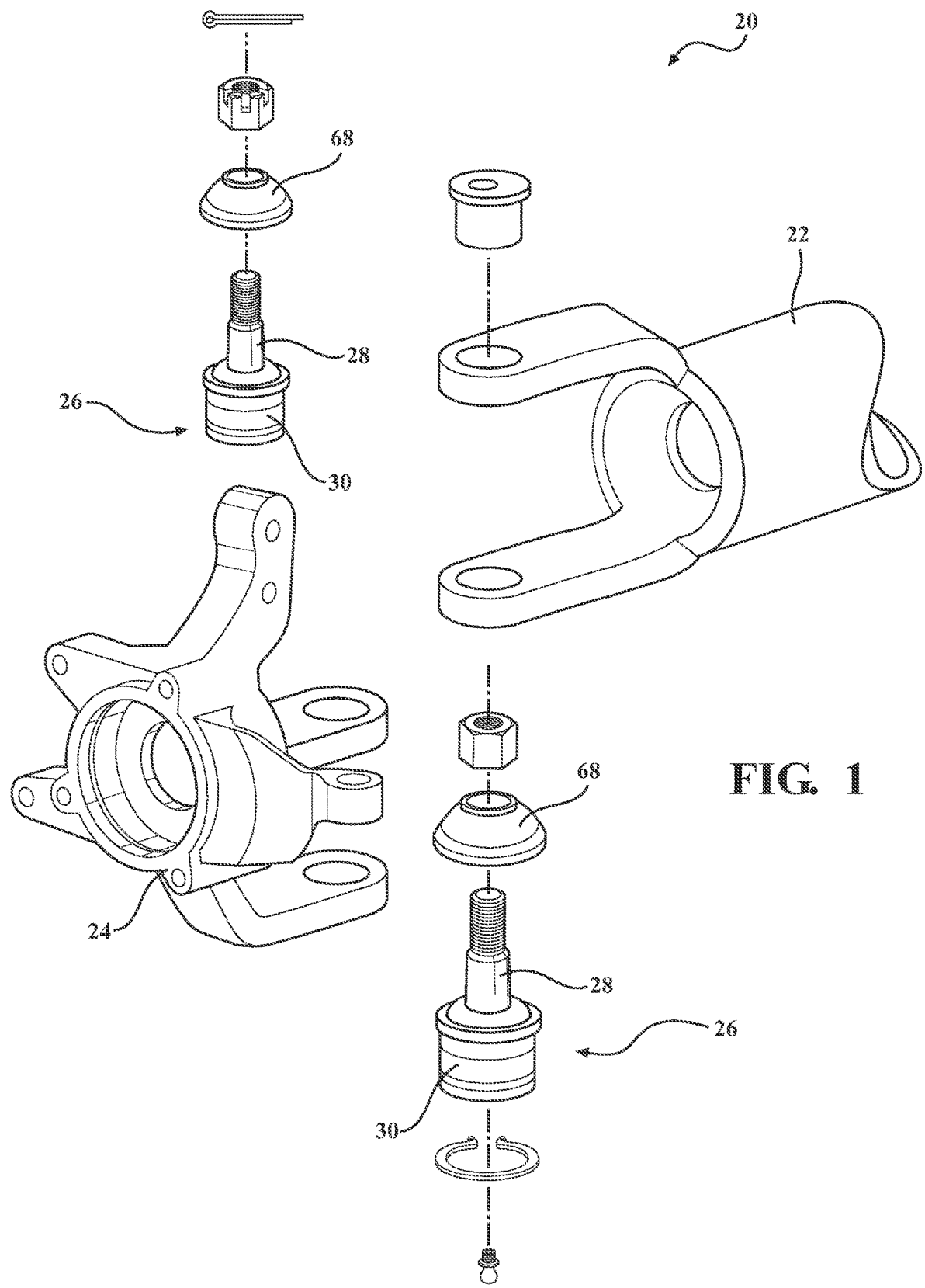
FIG. 1 is a perspective and partially exploded view of a solid axle suspension assembly which includes a pair of ball joints constructed according to one aspect of the present invention.
Figure 2:
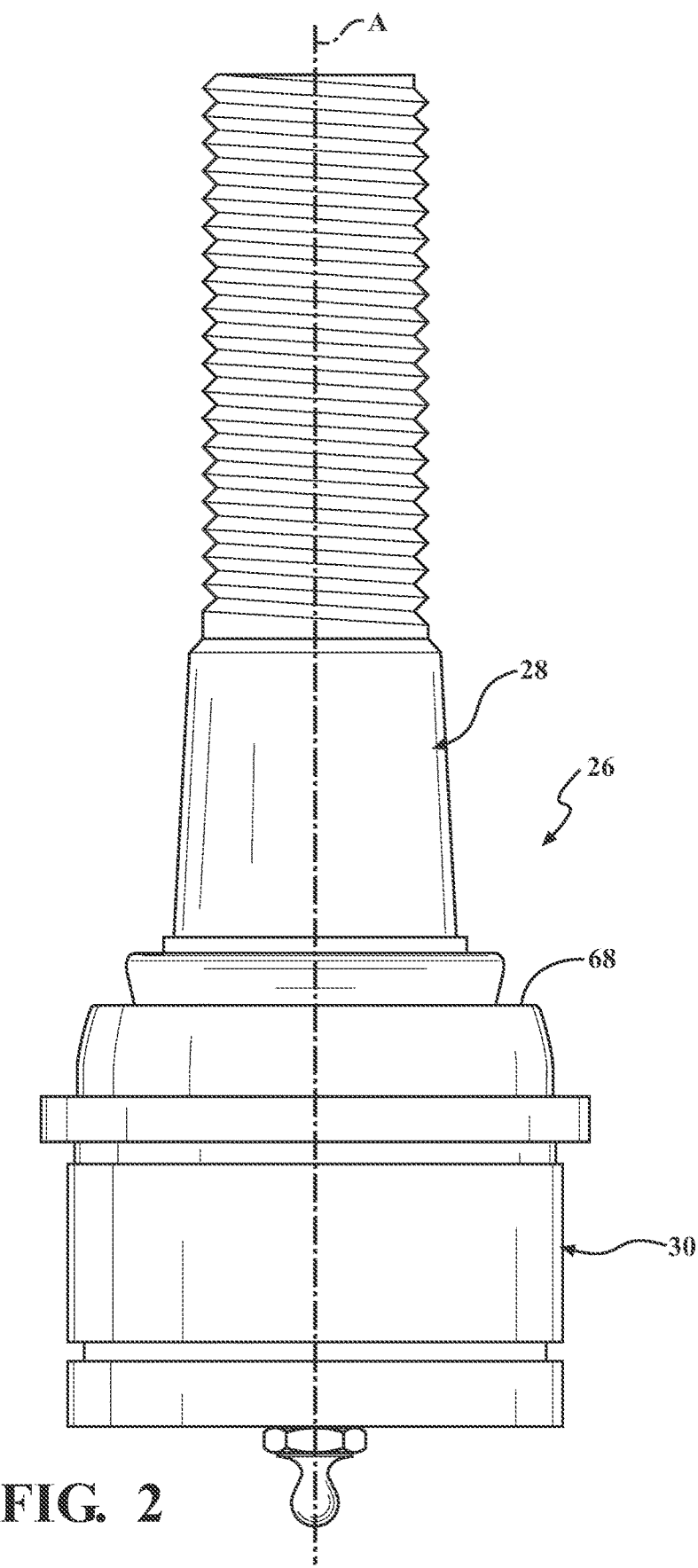
FIG. 2 is a front elevation view of one of the ball joints of FIG. 1.

Referring to the Figures, wherein like numerals indicate corresponding parts throughout the several views, a solid axle assembly 20 for a vehicle is generally shown in FIG. 1. As shown, the solid axle assembly 20 includes an axle 22 which extends laterally across a vehicle and a knuckle 24 that supports a wheel hub (not shown). A pair of ball socket assemblies (hereinafter referred to as ball joints 26) operably attach the knuckle 24 with the axle 22. The ball joints 26 have respective ball studs 28 which are aligned with one another along a common vertical axis for allowing the knuckle 24 to pivot relative to the axle 22 about the vertical axis in response to a steering input from a driver of the vehicle. The ball joints 26 are preferably of identical or similar construction to reduce errors when installing the ball joints 26 in the solid axle assembly 20. Each ball joint 26 has a housing 30 which is fixedly attached with either the knuckle 24 or the axle 22 and a ball stud 28 which is fixedly attached to the other.

Figure 3:
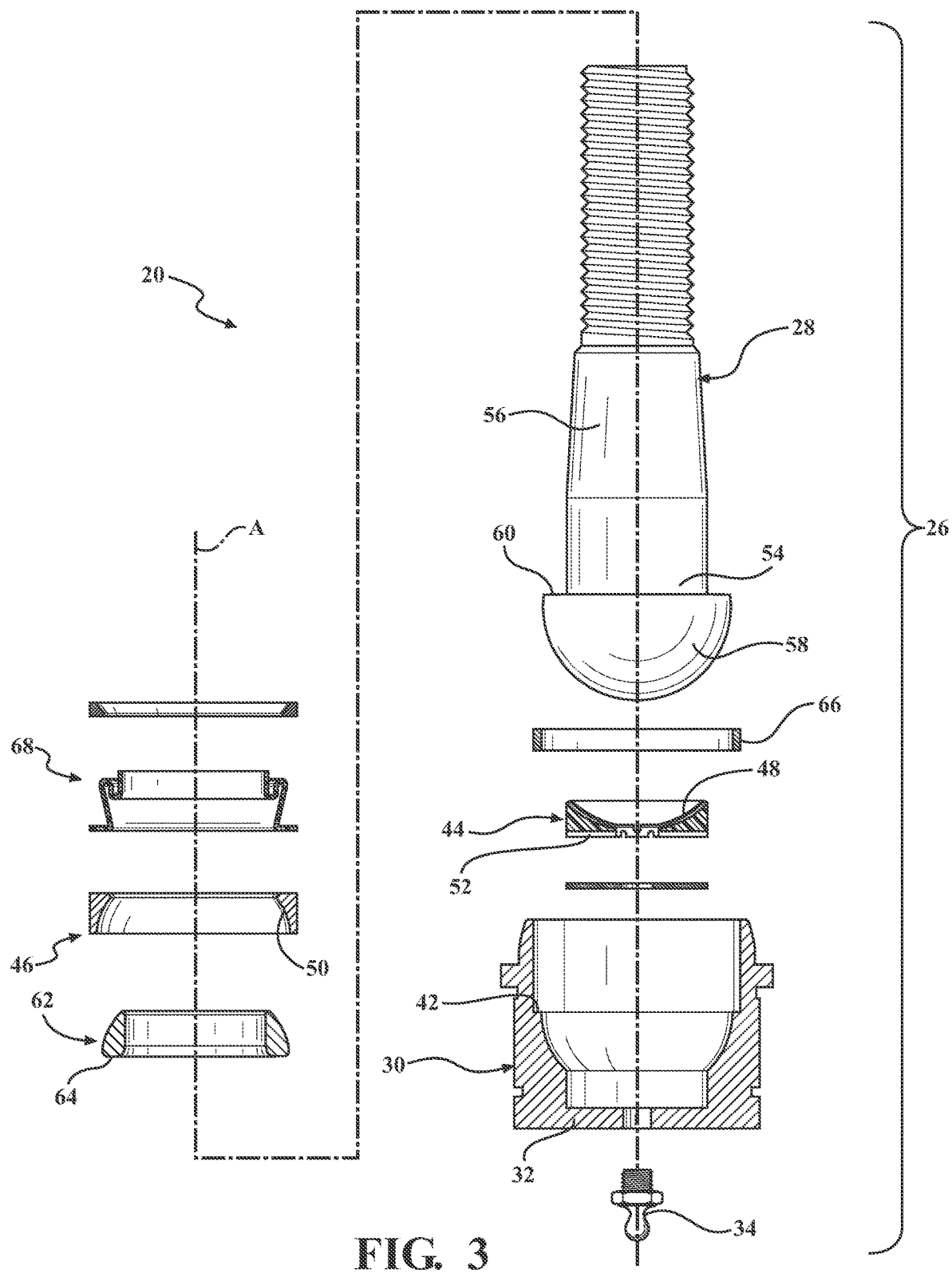
FIG. 3 is an exploded and partially cross-sectional view of the ball joint of FIG. 2.

Referring now FIG. 3, for each of the ball joints 26, the housing 30 has an inner surface that surrounds an inner bore which extends along a central axis A from a lower wall 32 at a closed first end of the housing 30 to an open second end of the housing 30. The lower wall 32 has a lubricant opening that receives a grease fitting 34 (also known as a Zerk fitting) for conveying a lubricant, such as grease, into the inner bore to both initially lubricate the components of the ball joint 26 and to re-lubricate the ball joint 26 as part of routine maintenance. The housing 30 is preferably made as a monolithic piece of metal, such as steel or a steel alloy, and may be shaped through any suitable process or combination of processes including, for example, forging, casting, machining, etc. In the exemplary embodiment, the housing 30 has a cartridge-style construction in that is configured for press-fitting into an opening in the axle 22 (shown in FIG. 1) or the knuckle 24 (also shown in FIG. 1).

Figure 4:
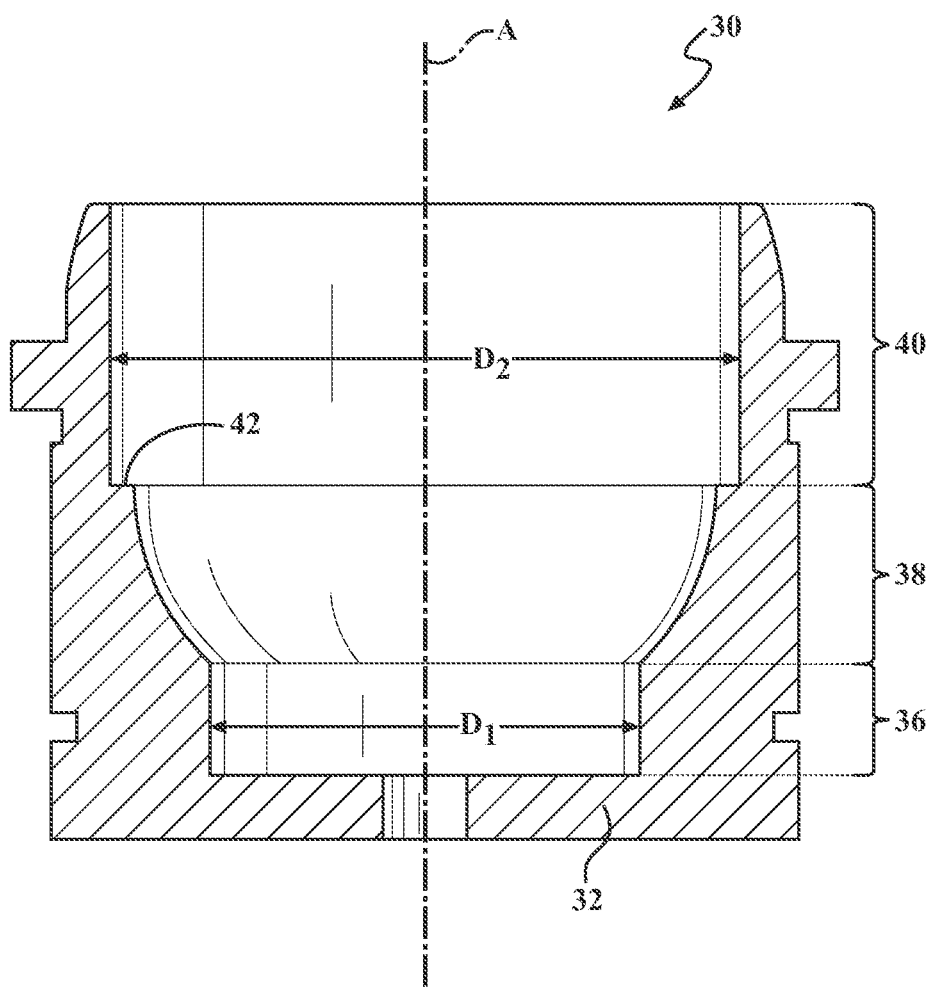
FIG. 4 is a cross-sectional view of a housing of the ball joint of FIG. 2.

As shown in FIG. 4, the inner bore of the housing 30 has a progressively increasing diameter from the lower wall 32 to the open second end. Specifically, the inner bore serially has a first portion 36 with a generally constant first diameter D1 adjacent the lower wall 32, a second portion 38 with a progressively increasing diameter, and a third portion 40 with a generally constant second diameter D2 adjacent the open second end. As shown, the second diameter D2 of the third portion 40 is greater than the first diameter D1 of the first portion 36. In the second portion 38, the inner surface of the housing 30 is curved to increase the diameter of the second portion 38 in an axial direction towards the open second end. Between the second and third portions 38, 40 of the inner bore, the housing 30 presents a shoulder 42 which faces towards the open second end.

Referring back to FIG. 3, the ball joint 26 includes a backing bearing 44 and an exit bearing 46 which are disposed in the inner bore of the housing 30. The backing and exit bearings 44, 46 have respective semi-spherically curved bearing surfaces 48, 50 which are shaped to provide a low friction interface between the housing 30 and ball stud 28, thereby allowing the housing 30 and ball stud 28 to rotate and articulate relative to one another during operation of the vehicle.

Figure 6:
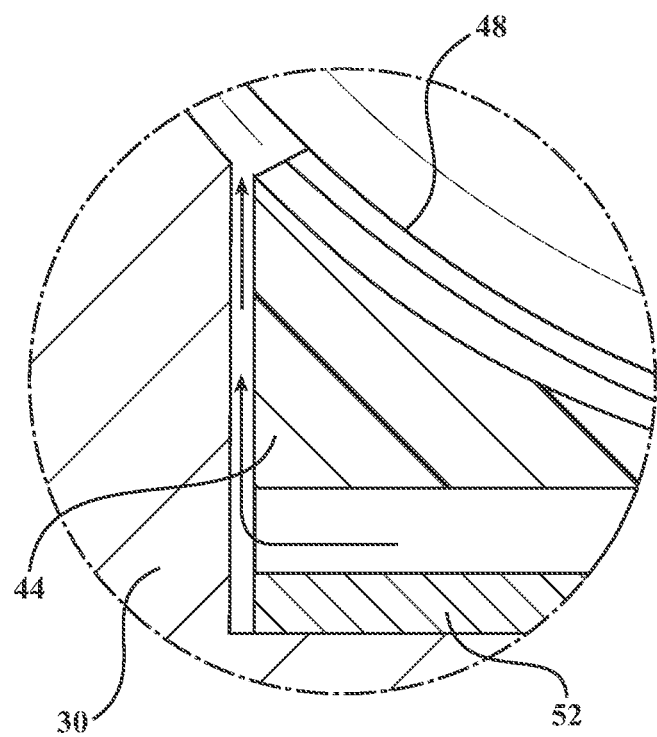
FIG. 6 is an enlarged view of a portion of the ball joint of FIG. 5.

The backing bearing 44 is received in the first portion 36 of the inner bore and has a semi-spherically curved first bearing surface 48 which faces axially towards the open second end of the housing 30. The backing bearing 44 also has an outer surface with an outer diameter that is less than the first diameter D1 (shown in FIG. 4) of the first portion 36 (also shown in FIG. 4) to present a gap (enlarged in FIG. 6) between the outer surface of the backing bearing 44 and an inner surface of the housing 30. As such, the backing bearing 44 is allowed to float in a radial direction within the first portion 36 of the inner bore within confines established by the gap. The backing bearing 44 also includes a lubricant opening which is aligned with the lubricant opening of the lower wall 32 of the housing 30. The first bearing surface 48 of the exemplary embodiment is provided with a plurality of first grooves formed thereon for distributing a lubricant from the lubricant opening into the second portion 38 of the inner bore.

A thrust washer 52 is positioned in the first portion 36 of the inner bore between the backing bearing 44 and the lower wall 32 of the housing 30 to provide a low friction interface between the backing bearing 44 and the lower wall 32, thereby allowing the backing bearing 44 to more freely move within the inner bore of the housing 30. In the exemplary embodiment, a lower surface of the backing bearing 44, opposite of the curved first bearing surface 48, presents a plurality of lubricant channels for conveying the lubricant between the backing bearing 44 and the thrust washer 52 to further reduce friction between the backing bearing 44 and the thrust washer 52. The thrust washer 52 is preferably made of metal or a polymeric material and may be shaped through any suitable process.

Figure 5:
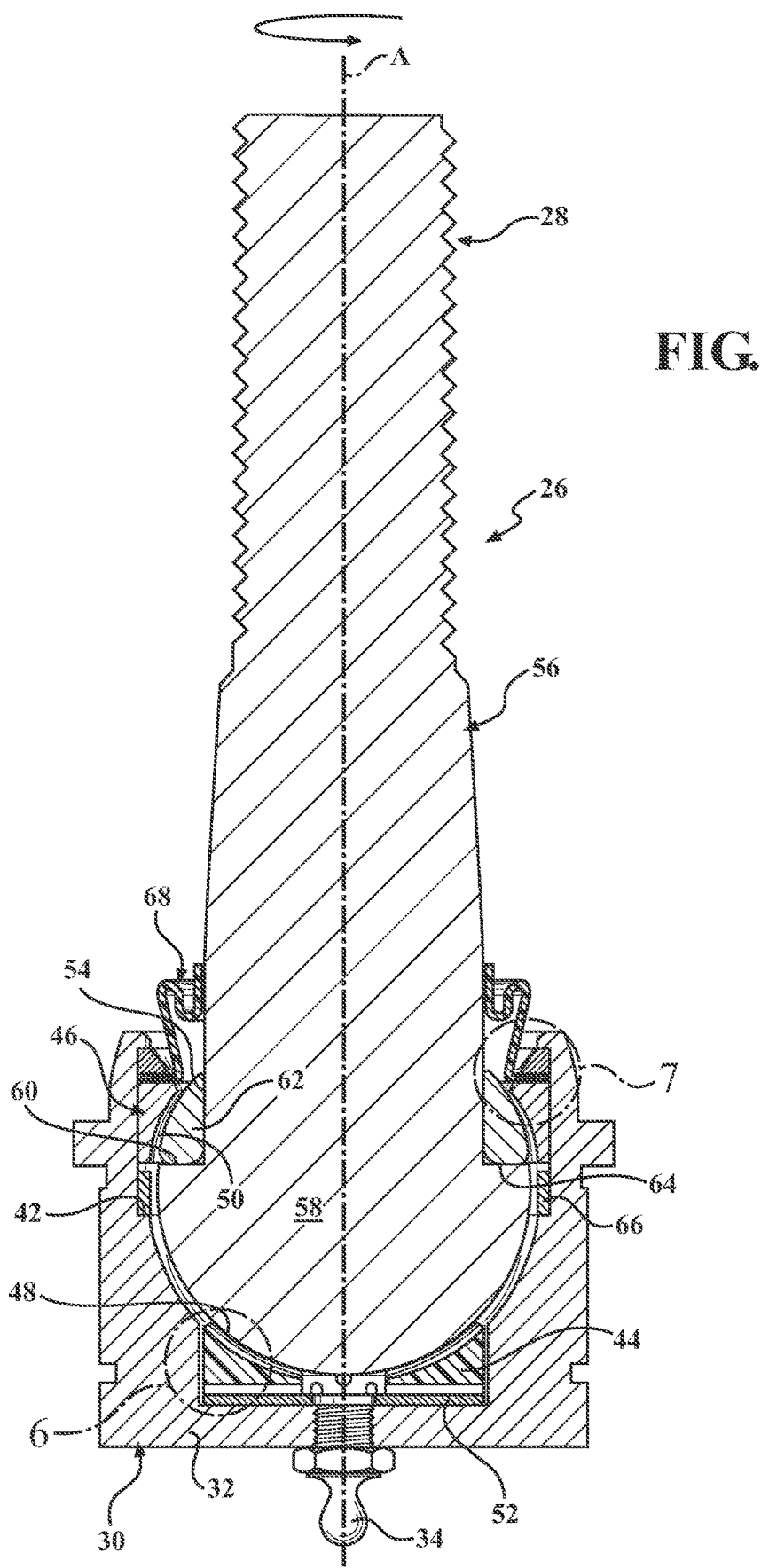
FIG. 5 is a cross-sectional view of the ball joint of FIG. 2.

The ball stud 28 has a cylindrical portion 54, a shank portion 56, and a semi-spherically curved portion 58. In the exemplary embodiment, the semi-spherically curved portion is generally hemispherical in shape (i.e., approximately half a ball) and is therefore referred to hereinafter as being a "hemisphere portion 58". The hemisphere portion 58 and the cylindrical portion 54 are fully disposed in the inner bore of the housing 30, and the shank portion 56 projects out of the inner bore through the open second end of the housing 30. The ball stud 28 also has a first planar surface 60 which is annular in shape and which extends between approximately an equator of the hemisphere portion 58 and the cylindrical portion 54. When the ball stud 28 is in the vertical orientation shown in FIG. 5, the first planar surface 60 lies in a plane that is perpendicular to the central axis A. In an axial direction, the cylindrical portion 54 has a constant diameter from the first planar surface 60 to the shank portion 56. The shank portion 56 extends to a distal end which is threaded for receiving a nut to fixedly attach the ball stud 28 with the axle 22 (shown in FIG. 1) or the knuckle 24 (also shown in FIG. 1).

A third bearing 62, which is made as a separate piece from the ball stud 28, extends annularly around the cylindrical portion 54 of the ball stud 28. In the axial direction, the third bearing 62 is located between the backing and exit bearings 44, 46. The third bearing 62 has a curved outer surface with a similar radius of curvature as the hemisphere portion 58 of the ball stud 28. Thus, the third bearing 62 and the hemisphere portion 58 of the ball stud 28 together define a ball, or generally semi-spherical shape. The third bearing 62 has a second planar surface 64 which is annular in shape and which is in surface-to-surface and slidable contact with the first planar surface 60 of the ball stud 28. The third bearing 62 is in a clearance, or loose, fitting relationship with the ball stud 28 such that it can freely rotate about the ball stud 28 around the central axis A. The third bearing 62 is preferably made as a monolithic piece of metal, such as steel or an alloy steel, and may be shaped through any suitable operation.

A radial ring 66 is positioned in the third portion 40 of the inner bore and abuts the shoulder 42 of the housing 30. The radial ring 66 is a separate piece from the backing bearing 44 and is spaced axially therefrom by a gap in the second portion 38 of the inner bore. The radial ring 66 is annular in shape and has a radially inwardly facing surface which is in slidable contact with the hemisphere portion 58 of the ball stud 28 and/or the third bearing 62 for transferring radial forces between the ball stud 28 and the housing 30. In the exemplary embodiment, the inner surface of the radial ring 66 includes a plurality of lubrication grooves for conveying lubricant in the inner bore axially across the radial ring 66. A gap between the backing bearing 44 and the radial ring 66 acts as a lubrication reservoir which holds the lubricant.

The exit bearing 46 is received in the third portion 40 of the inner bore, and its second curved bearing surface 50 is in slidable contact with the curved outer surface of the third bearing 62 to allow the third bearing 62 and ball stud 28 to rotate and articulate relative to the housing 30 during operation of the vehicle. In the exemplary embodiment, the second curved bearing surface 50 of the exit bearing 46 has a plurality of lubrication grooves for distributing the lubricant across the surface of contact between the exit bearing 46 and the third bearing 62. The exit bearing 46 has a generally flat, or planar, top surface which faces towards the open second end of the housing 30.

During operation of the vehicle, this arrangement of the components inside of the inner bore ensures that the radial ring 66 transfers all or substantially all of the radial forces between the ball stud 28 and the housing 30 while the backing and exit bearings 44, 46 transfer all or substantially all of the axial forces between the ball stud 28 and the housing 30.

Figure 7:
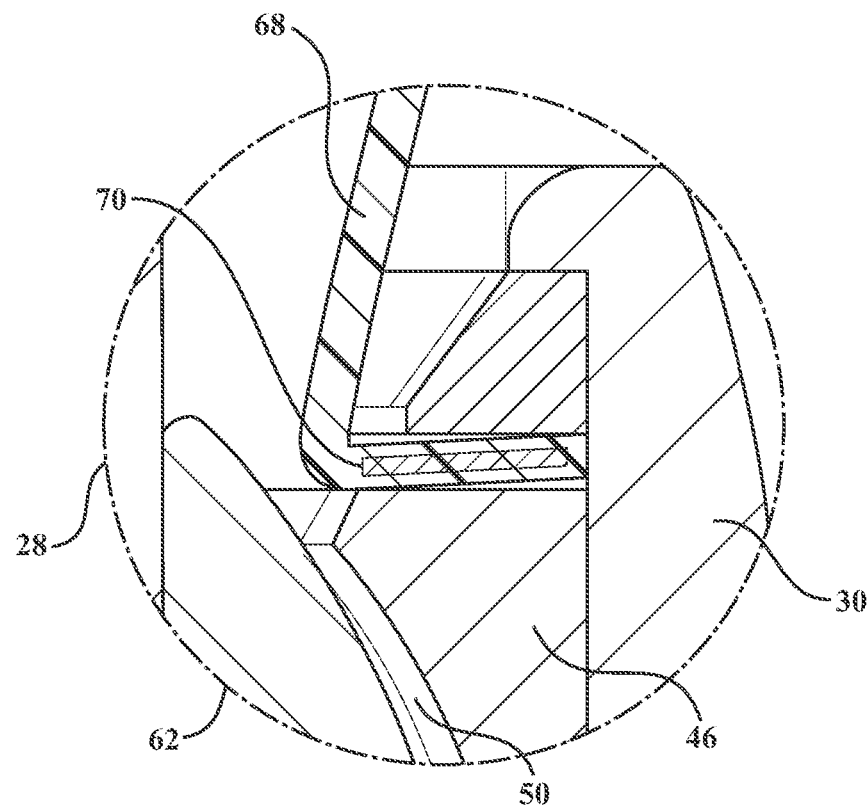
FIG. 7 is another enlarged view of a different portion of the ball joint of FIG. 5.
Figure 8:
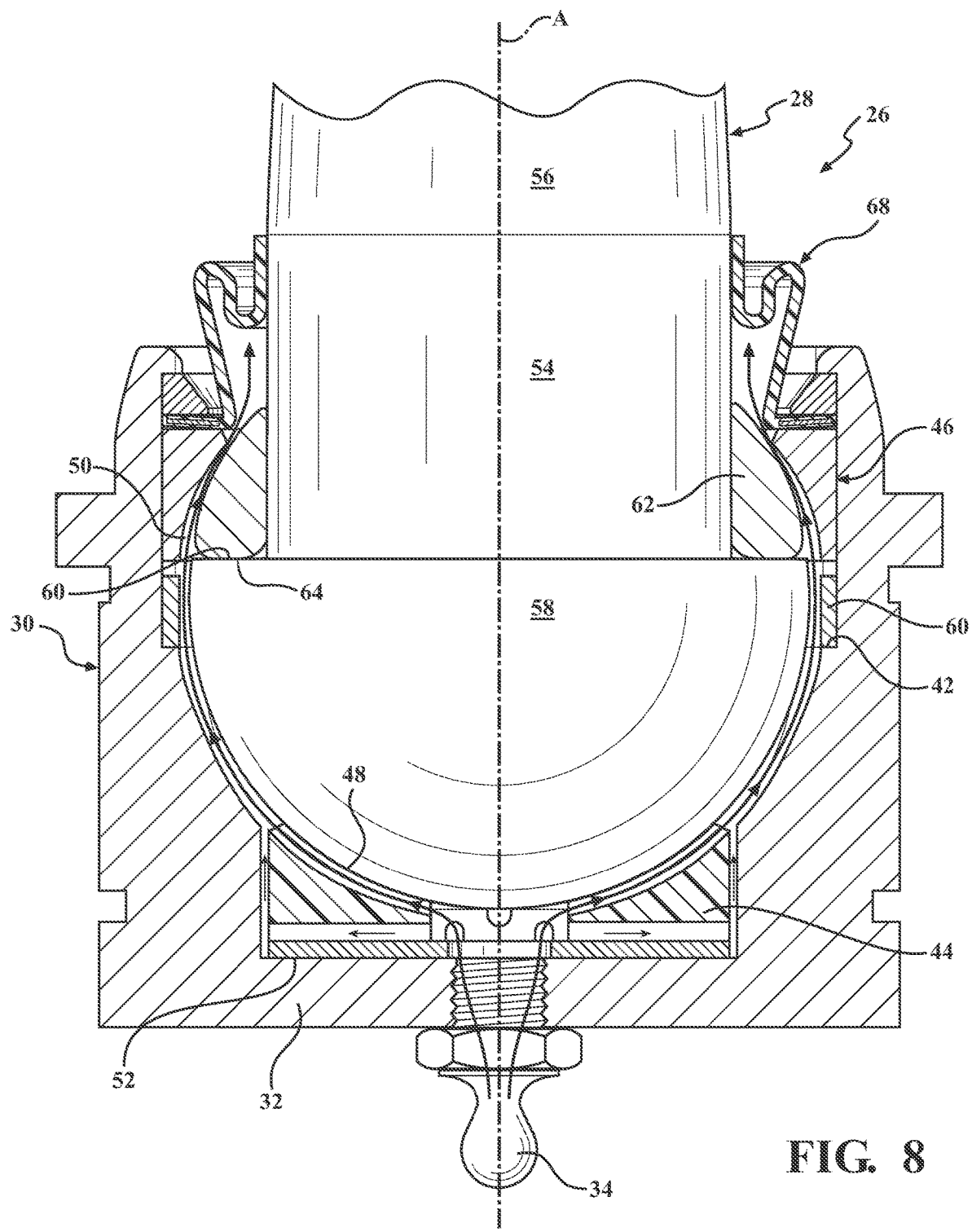
FIG. 8 is a cross-sectional and fragmentary view of the ball joint of FIG. 5 and illustrating a lubrication flow path.

The ball joint 26 further includes a dust boot 68 which is sealed against the housing 30 and against the shank portion 56 of the ball stud 28 for maintaining the lubricant in the interior of the ball joint 26 and for keeping contaminants outside of the ball joint 26. The dust boot 68 includes a first boot end which presents a radially outwardly extending flange with a spring 70 (best shown in FIG. 7), in the form of a Belleville washer 70 (also known as a washer spring), that is encased within a boot body at the radially outwardly extending flange. The radially outwardly extending flange is in surface-to-surface contact with the flat top surface of the exit bearing 46. The boot body is made of a flexible sealing material, such a rubber or a plastic material, to allow the dust boot 68 to flex as the housing 30 and ball stud 28 articulate relative to one another and maintain the seals established thereby.

A cover plate 72 is positioned at an opposite side of the radially outwardly extending flange of the dust boot 68. The housing 30 is deformed (such as through swaging) to present a radially inwardly extending lip 74 which traps the cover plate 72 and the radially outwardly extending flange of the dust boot 68 between the radially inwardly extending lip 74 and the exit bearing 46. Deforming the housing 30 also has the effect of elastically compressing the Belleville washer 70 to impart a preload force on the exit bearing 46 to bias the curved bearing surface of the exit bearing 46, thereby biasing the curved second outer surface 50 of the third bearing 62.

In the event that the two ball joints 26 are misinstalled in the solid axle assembly 20 such that the vertical distance between the ball studs 28 is not within prescribed tolerances, one of the ball studs 28 will end up absorbing all or substantially all of the vertical load from the weight of the vehicle. If this occurs, in the ball joint 26 that carries the greater load, the axial loads will be concentrated in only a small portion of the surface of contact between the third bearing 62 and the exit bearing 46, thereby producing a very high pressure force in this location. Such a pressure force may restrict relative rotation between the third bearing 62 and the housing 30. However, relative rotation between the ball stud 28 and the housing 30 is still possible without excessive friction due to the large surface-to-surface contact area between the first and second planar surfaces 60, 64 of the ball stud 28 and the third bearing 62 respectively. Thus, the third bearing 62 allows the ball stud 28 and housing 30 to still rotate relative to one another. The cylindrical shape of the cylindrical portion 54 of the ball stud 28 ensures that all axial forces between the third bearing 62 and the ball stud 28 are transferred between, and distributed across, the first and second planar surfaces 60, 64.

Another aspect of the present invention is related to a method of repairing a solid axle assembly 20, such as the solid axle assembly 20 shown in FIG. 1. The method includes the step of removing a previously worn ball joint from an opening in either the axle 22 or the knuckle 24. The method continues with the step of inserting a new ball joint 26, such as the ball joint 26 discussed above and shown in FIGS. 2-8, into the opening.

Obviously, many modifications and variations of the present invention are possible in light of the above teachings and may be practiced otherwise than as specifically described while within the scope of the appended claims. Additionally, it is to be understood that all features of all claims and all embodiments can be combined with each other as long as they do not contradict each other. It is further to be appreciated that the use of directional terms such as "top", "bottom", "upper", and "lower" are with reference to the orientations of certain features in the drawings and are not intended to require any particular orientation.

What is claimed is:

1. A ball socket assembly, comprising:

a housing having an inner surface and a lower wall that are made as a monolithic piece and which surround an inner bore that extends along a central axis, the inner bore comprising a curved inner bore surface;

a ball stud having a semi-spherically curved portion and a cylindrical portion and a shank portion, said semi-spherically curved portion and said cylindrical portion being disposed in said inner bore of said housing, and said shank portion projecting out of said inner bore through an open end of said housing opposite of said lower wall;

a backing bearing and an exit bearing received in said inner bore of said housing, said backing and exit bearings both having respective curved inner surfaces;

a third bearing received on the cylindrical portion of said ball stud and having a curved outer surface which cooperates with said curved inner bore surface of said housing, and cooperates with said curved inner surface of at least one of said exit bearing and said backing bearing for allowing said ball stud and said third bearing to articulate and rotate relative to said housing; and said third bearing being in slidable contact with said cylindrical portion of said ball stud for allowing said ball stud to more freely rotate relative to said housing about said central axis.

2. The ball socket assembly as set forth in claim 1 wherein said ball stud has a first planar surface which extends between said semi-spherically curved portion and said cylindrical portion, wherein said third bearing has a second planar surface, and wherein said first and second planar surfaces are in surface-to-surface contact with one another.

3. The ball socket assembly as set forth in claim 1 wherein said third bearing is located axially between said backing bearing and said exit bearing.

4. The ball socket assembly as set forth in claim 1 wherein said third bearing is in a loose fit relationship with said cylindrical portion of said ball stud.

5. The ball socket assembly as set forth in claim 1 further including a washer spring received in said inner bore of said housing and being elastically deformed to impart an axial force on said exit bearing to bias said curved inner surface of said exit bearing against said curved outer surface of said third bearing.

6. The ball socket assembly as set forth in claim 1 wherein said semi-spherically curved portion of said ball stud is generally hemispherical in shape.

7. A solid axle assembly in a vehicle, comprising:
   an axle;
   a knuckle;
   a pair of ball socket assemblies operably connecting said knuckle with said axle and allowing said knuckle to rotate relative to said axle about a vertical axis; and each of said ball socket assemblies comprising;
      a housing having an inner surface and a lower wall that are made as a monolithic piece and which surround an inner bore that extends along a central axis, the inner bore comprising a curved inner bore surface;
      a ball stud having a semi-spherically curved portion and a cylindrical portion and a shank portion, said semi-spherically curved portion and said cylindrical portion being disposed in said inner bore of said housing, and said shank portion projecting out of said inner bore through an open end of said housing opposite of said lower wall;
      a backing bearing and an exit bearing received in said inner bore of said housing, said backing and exit bearings both having respective curved inner surfaces;
      a third bearing received on the cylindrical portion of said ball stud and having a curved outer surface which cooperates with said curved inner bore surface of the housing, and cooperates with said curved inner surface of at least one of said exit bearing and said backing bearing for allowing said ball stud and said third bearing to articulate and rotate relative to said housing; and
      said third bearing being in slidable contact with said cylindrical portion of said ball stud for allowing said ball stud to more freely rotate relative to said housing about said central axis.

8. The solid axle assembly as set forth in claim 7 wherein said ball stud has a first planar surface which extends between said semi-spherically curved portion and said cylindrical portion, wherein said third bearing has a second planar surface, and wherein said first and second planar surfaces are in surface-to-surface contact with one another.

9. The solid axle assembly as set forth in claim 7 wherein said third bearing is located axially between said backing bearing and said exit bearing.

10. The solid axle assembly as set forth in claim 7 wherein said third bearing is in a loose fit relationship with said cylindrical portion of said ball stud.

11. The solid axle assembly as set forth in claim 7 further including a washer spring received in said inner bore of said housing and being elastically deformed to impart an axial force on said exit bearing to bias said curved inner surface of said exit bearing against said curved outer surface of said third bearing.

12. The solid axle assembly as set forth in claim 7 wherein said semi-spherically curved portion of said ball stud is generally hemispherical in shape.

13. The ball socket assembly as set forth in claim 1 wherein the third bearing is located axially between the backing bearing and the exit bearing.

14. A method of repairing a solid axle assembly, comprising the steps of:
   removing a previously used ball socket assembly from an opening of an axle or a knuckle;
   inserting a ball socket assembly into the opening, the ball socket assembly comprising;
      a housing having an inner surface and a lower wall that are made as a monolithic piece and which surround an inner bore that extends along a central axis, the inner bore comprising a curved inner bore surface;
      a ball stud having a semi-spherically curved portion and a cylindrical portion and a shank portion, the semi-spherically curved portion and the cylindrical portion being disposed in the inner bore of the housing, and the shank portion projecting out of the inner bore through an open end of the housing opposite of the lower wall;
      a backing bearing and an exit bearing received in the inner bore of the housing, the backing and exit bearings both having respective curved inner surfaces;
      a third bearing received on the cylindrical portion of the ball stud and having a curved outer surface which cooperates with the curved inner bore surface of the housing, and cooperates with the curved inner surface of at least one of the exit bearing and the backing bearing for allowing the ball stud and the third bearing to articulate and rotate relative to the housing; and
      the third bearing being in slidable contact with the cylindrical portion of the ball stud for allowing the ball stud to more freely rotate relative to the housing about the central axis.

15. The method as set forth in claim 14 wherein the ball stud has a first planar surface which extends between the semi-spherically curved portion and the cylindrical portion, wherein the third bearing has a second planar surface, and wherein the first and second planar surfaces are in surface-to-surface contact with one another.

* * * * *